United States Patent [19]

Schach et al.

[11] 4,218,092
[45] Aug. 19, 1980

[54] SEAT RECLINER MECHANISM

[75] Inventors: Robert E. Schach, Rochester; Richard L. Van Eerden, Troy, both of Mich.

[73] Assignee: Rockwell International Corporation, Pittsburgh, Pa.

[21] Appl. No.: 889,275

[22] Filed: Mar. 23, 1978

[51] Int. Cl.² .............................................. A47C 1/025
[52] U.S. Cl. ...................................................... 297/367
[58] Field of Search .............................. 297/366–371, 297/373, 355

[56] References Cited

U.S. PATENT DOCUMENTS

| | | | |
|---|---|---|---|
| 3,901,100 | 8/1975 | Iida et al. | 297/367 X |
| 3,902,757 | 9/1975 | Yoshimura | 297/367 |
| 3,931,996 | 1/1976 | Yoshimura | 297/366 |
| 3,953,069 | 4/1976 | Tamura et al. | 297/367 |

FOREIGN PATENT DOCUMENTS

| | | | |
|---|---|---|---|
| 2006270 | 9/1971 | Fed. Rep. of Germany | 297/366 |
| 2404598 | 8/1975 | Fed. Rep. of Germany | 297/367 |
| 1212567 | 11/1970 | United Kingdom | 297/355 |

Primary Examiner—William E. Lyddane

[57] ABSTRACT

A seat recliner mechanism comprises a first plate for attachment to one side of the back of a seat and a second plate is pivotally connected to the first plate. The first plate is provided with a series of teeth formed in an arc whose radius is coincident with the pivot of the first and second plates. The second plate is attached to one side of the cushion of the seat and pivotally carries a locking pawl having a pin attached thereto whose longitudinal axis is parallel to the longitudinal axis through the pivot point. The locking pawl is provided with a series of teeth complementary to the teeth provided on the first plate for selective intermeshing therewith. First spring means pivotally bias the first plate toward the second plate. A release handle is pivotally connected at the pivot point to the first and second plates having a camming slot therein for receiving and camming the pin. The second spring means bias the release handle toward the second plate camming the pin and pawl toward the second plate to mesh the series of teeth on the pawl with the teeth on the first plate to lock the first plate with respect to the second plate. The release handle when pivoted against the second biasing means cams the pin and pawl away from the second plate to unmesh the series of teeth on the pawl with the teeth on the first plate to unlock the first plate with respect to the second plate.

3 Claims, 4 Drawing Figures

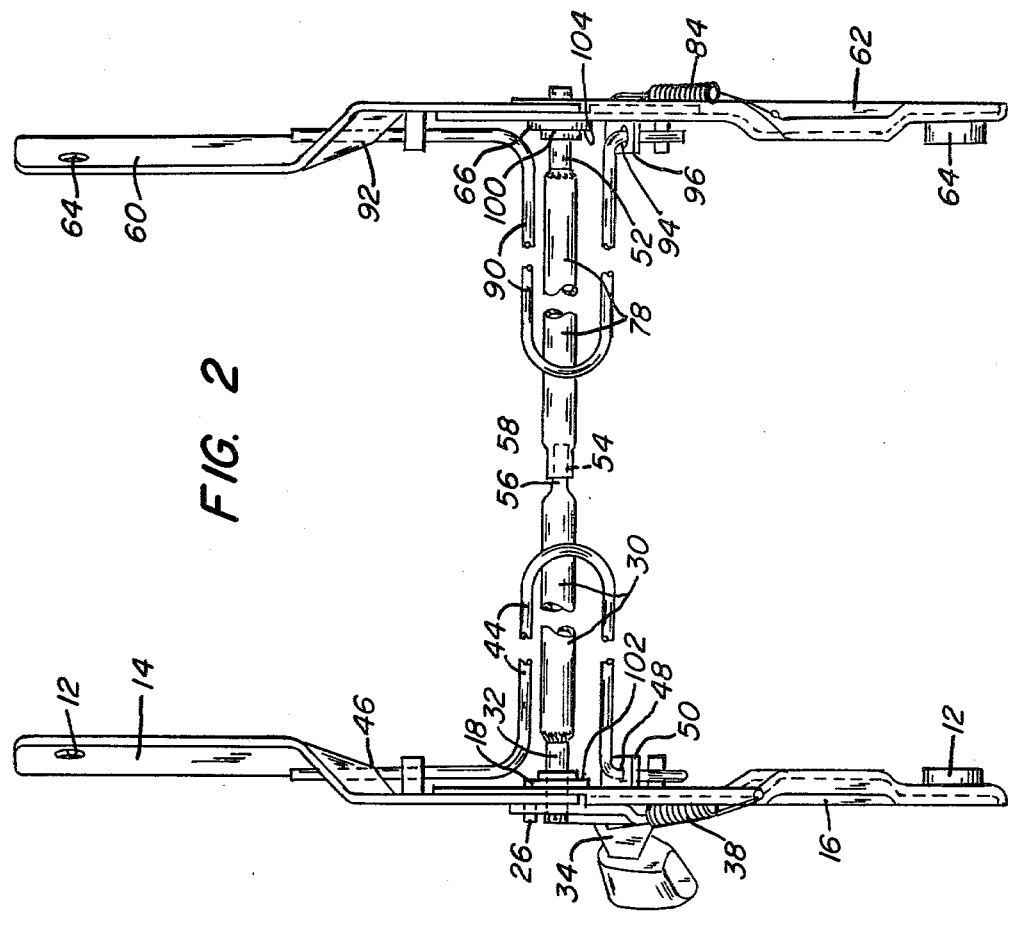
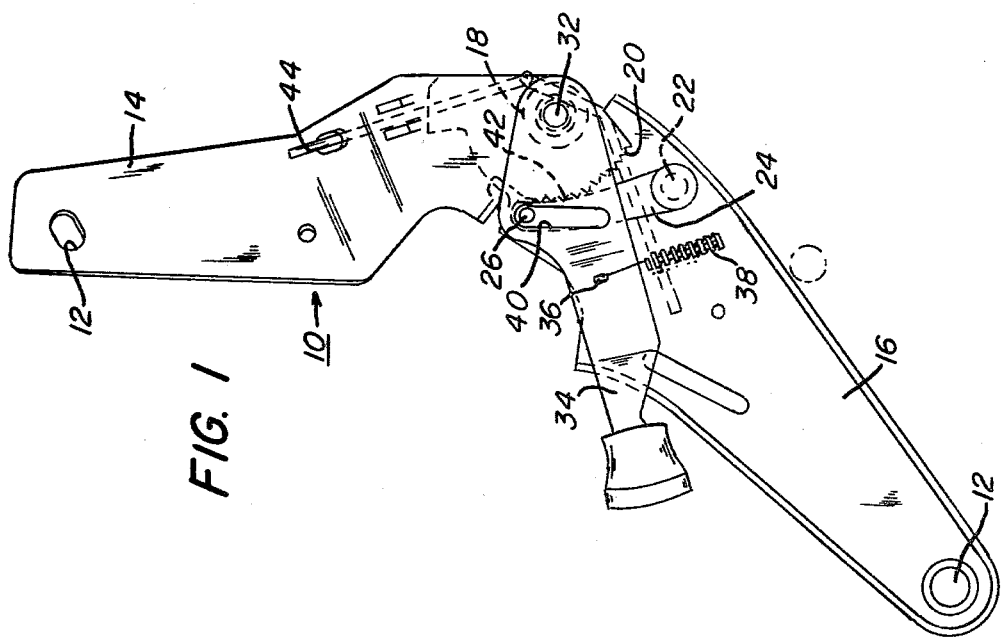

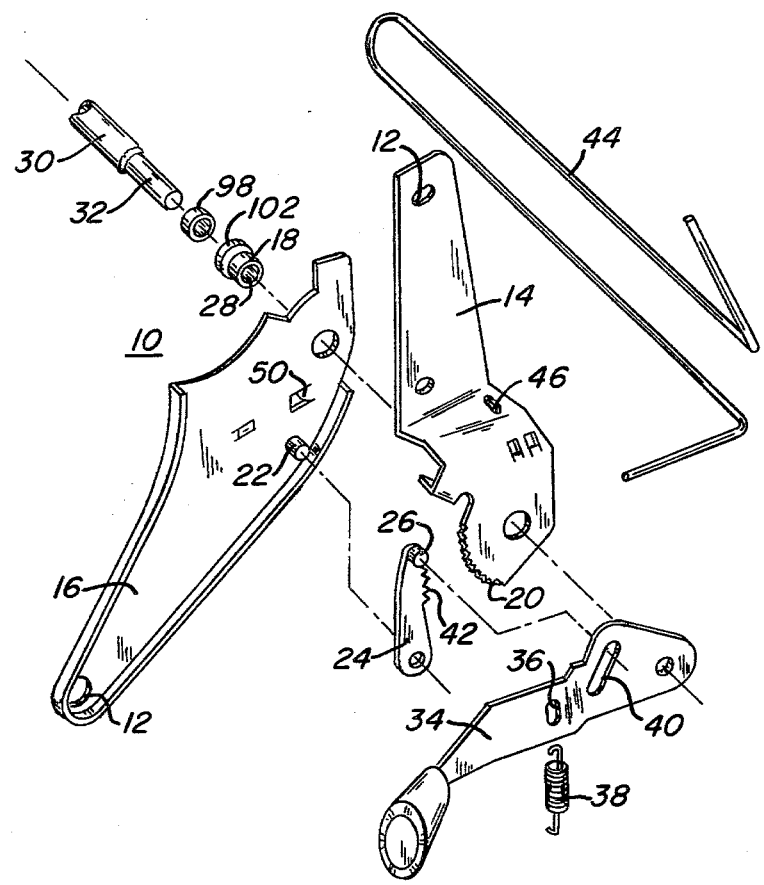

SEAT RECLINER MECHANISM

BACKGROUND OF THE INVENTION

1. Field of the Invention

The present invention relates to vehicle seats and to seat recliner mechanisms therefor. More particularly, the present invention relates to an adjustment mechanism which allows for adjusting of the seat back with respect to the seat cushion.

2. Description of the Prior Art

The prior art is replete with various forms of such seat recliner mechanisms and may be generally described as complex and possibly susceptible to accidental disengagement in an accident mode. Examples of such typical prior art are the following U.S. Pat. Nos. 3,508,294; 3,673,891; 3,840,268; 3,893,206; 3,902,757; 3,973,288 and 4,035,866. German Pat. Nos. 2,328,908 and 2,414,910 are also typical of the above class of seat recliner mechanisms.

U.S. Pat. No. 3,902,757 and German Pat. No. 2,414,910 show seat recliner mechanisms having hinge fittings for an adjustable back seat comprising a first plate fixed to a back rest and a second plate fixed to a cushion. The plates form recesses and a ratchet in the form of turnable disc. The ratchet is peripherally toothed and may be brought into engagement with the recesses. The ratchet is supported so that it can be turned and has a radial slot which engages a pin fixed to the seat for locking the back rest into position.

U.S. Pat. No. 3,840,268 shows an adjustable back rest having a first part with a fixed set of teeth and a pivotable second part with a second set of teeth. The second part moves transversely relative to the fixed set of teeth by camming means with an operating handle to engage and disengage both sets of teeth.

Finally, German Pat. No. 2,328,908 shows a fixed fitting on a seat cushion and pivoting fitting fixed to the seat back. The pivoting fitting moves on a common axis with the seat back. It is held in position by a two-armed spring loaded pawl or latch. The pivot has bolts fitting onto the other plate and anchor hooks on the opposite side of the arms of the latch. The latch being operated by a hand lever or cable.

These patents illustrate the general state of the art and are believed to be workable embodiments of the prior art seat recliner mechanisms which would perform marginally at best and in the passenger vehicle environment. Not only are these prior art forms of seat recliner mechanisms complex utilizing multitudinous interacting parts which may malfunction in operation but further involving substantial weight penalty. It is with the basic problems of reliability and weight that the present invention was conceived.

SUMMARY OF THE INVENTION

It is a primary object of the present invention to provide a seat recliner mechanism comprising a first plate for attachment to one side of the back of a seat with a second plate pivotally connected to the first plate. The first plate is provided with a series of teeth formed in an arc whose radius is coincident with the pivot point of the first and second plates. The second plate is attached to one side of the cushion of the seat and pivotally carries a locking pawl with a pin attached thereto whose longitudinal axis is parallel to the longitudinal axis through the pivot point. The locking pawl is provided with a series of teeth complementary to the teeth of the first plate for selective intermeshing therewith. First spring means are provided to pivotally bais the first plate toward the second plate. A release handle is pivotally connected at the pivot point to the first and second plates having a camming slot therein for receiving and camming the pin. Second spring means bias the release handle toward the second plate to mesh the series of teeth on the pawl with the teeth on the first plate to lock the first plate with respect to the second plate. The release handle when pivoted against the second biasing means cams the pin and pawl away from the second plate to unmesh the series of teeth on the pawl with the teeth on the first plate to unlock the first plate with respect to the second plate.

It is another object of the present invention to provide a seat recliner mechanism wherein the first and second plates pivot on an outer surface of a bushing with the release handle connected to a first rotary connecting shaft received within the bushing and in bearing engagement with the cylindrical inner surface thereof.

It is still another object of the present invention to provide a seat recliner mechanism wherein the first rotary connecting shaft is coupled to a second rotary connecting shaft. The length of the first and second rotary connecting shafts generally spans the width of the seat back and seat cushion with the outboard end of the second rotary connecting shaft being drivingly connected to a release lever.

Another object of the present invention is to provide a seat recliner mechanism wherein a third plate is attached to the back of the seat at the opposite side of the first plate and pivotally connected to a third plate. The third plate is provided with a series of teeth formed in an arc whose radius is coincident with the pivot point of the third and fourth plates. The fourth plate is attached to the cushion of the seat at the opposite side of the second plate and pivotally carries a locking pawl with a pin attached thereto whose longitudinal axis is parallel to the longitudinal axis through the pivot point. The locking pawl is provided with a series of teeth complementary to the teeth provided on the third plate for selective intermeshing therewith. Third spring means are provided to pivotally bias the third plate toward the fourth plate. The release lever acts in concert with the release handle through the first and second rotary connecting shafts and has a camming slot therein for receiving and camming the pin. Fourth spring means bias the release lever toward the fourth plate to cam the pin and pawl toward the fourth plate to mesh the series of teeth on the pawl with the teeth on the third plate to lock the third plate with respect to the fourth plate. When the release lever is pivoted against the fourth biasing means it cams the pin and pawl away from the third plate to unmesh the series of teeth on the pawl with the teeth on the third plate to unlock the third plate with respect to the fourth plate.

Still another object of the present invention is to provide a seat recliner mechanism wherein the third and fourth plates pivot on an outer surface of a bushing with the second rotary connecting shaft received within the bushing and in bearing engagement with the cylindrical inner surface thereof.

A further object of the present invention is to provide a seat recliner mechanism wherein the second and fourth spring means are helically would springs connected to the release handle and release lever respectively and to the second and fourth plates respectively.

A still further object of the present invention is to provide a seat recliner mechanism wherein the first and third spring means are inwardly facing substantially U-shaped torsion bars connected to the first and second plates and third and fourth plates respectively.

Another object of the present invention is to provide a seat recliner mechanism wherein the first and second rotary connecting shafts are mechanically coupled to each other in a non-interference fit at substantially the mid point of the cushion and back of the seat.

Still another object of the present invention is to provide a seat recliner mechanism wherein the bushings which pivotally connect the first and second and third and fourth plates are each provided with an annular collar the radial face of which are in bearing engagement with the radial face of a collar formed on each of the first and second rotary connecting shafts.

A further object of the present invention is to provide a seat recliner mechanism wherein there are stop means provided on the first and second and third and fourth plates to limit the travel of the first and second plates and the third and fourth plates with respect to each other to approximately a 51 degree arc.

It is another very important object of the present invention to provide a seat recliner mechanism that is lightweight and highly reliable.

Another important object of the present invention is to provide a rotary seat recliner mechanism that is inexpensive to manufacture utilizing automatic high volume manufacturing techniques.

It is, accordingly, a further object of the present invention to provide a seat recliner mechanism to carry out the operations and functions described in the foregoing.

Other objects and features of the invention will become apparent as the description proceeds especially when taken in conjunction with the accompanying drawings illustrating certain preferred embodiments of the invention.

BRIEF DESCRIPTION OF THE DRAWINGS

FIG. 1 is an elevational view of an end of the seat recliner mechanism in accordance with the present invention.

FIG. 2 is a rear elevational view showing the seat recliner mechanism of FIG. 1 at opposite sides of the vehicle seat.

FIG. 3 is an exploded isometric view of the left side of the seat recliner mechanism of FIG. 2.

DESCRIPTION OF THE INVENTION

Figure 4:
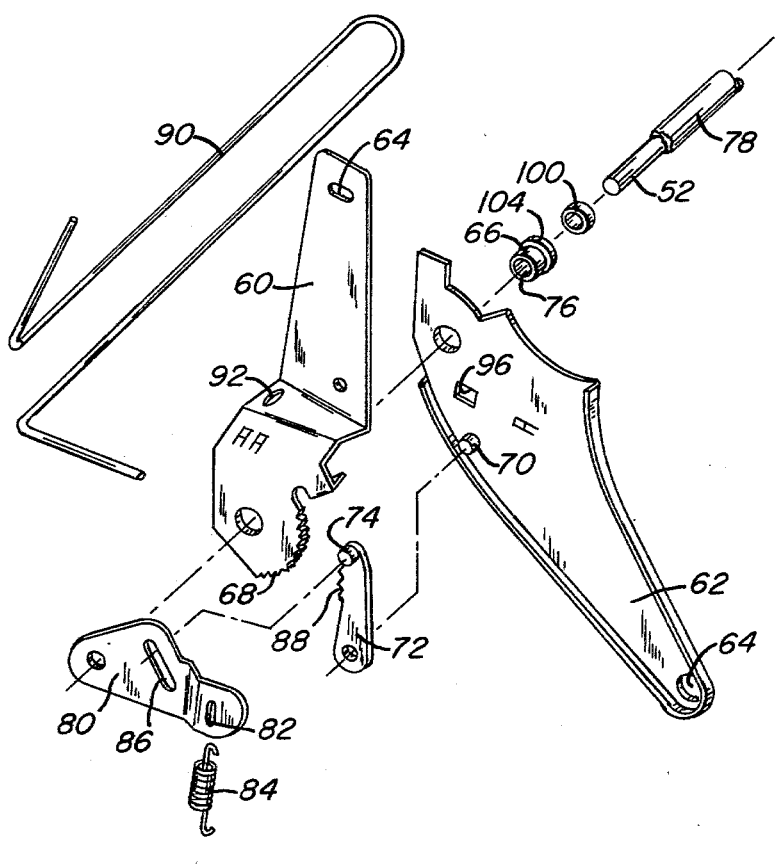
FIG. 4 is an exploded isometric view of the right side of the seat recliner mechanism of FIG. 2.

Referring now to the drawings and in particular FIGS. 1 and 2, there is shown a seat recliner mechanism 10 which is adapted to be installed in automotive vehicles and, in particular, to the seat and cushion thereof. These mechanisms 10 are suitably connected to the seat cushion frame and seat back frame by suitable and appropriate fastening means (not shown) which are inserted through a plurality of openings 12 provided in the seat recliner mechanism 10. The fastening means such as bolts are typically threadedly connected to their respective frames (also not shown). The seat recliner mechanism 10 is provided with a first plate 14 which is formed and contoured to abut the seat back frame for attachment thereto. The first plate 14 is pivotally connected to a second plate 16 at a bushing 18. The first plate 14 and the second plate 16 pivot on the outer cylindrical surface of the bushing 18.

The first plate 14 is provided with a series of teeth 20 and these teeth 20 may be formed on the first plate 14. The series of teeth 20 are formed on the first plate 14 in an arc whose radius is coincident with the radius of the bushing 18 and, therefore, the pivot point of the first plate 14 and the second plate 16.

The second plate 16 is suitably formed and contoured to abut and be fixedly attached to the cushion frame (not shown) by suitable fastening means, such as a bolt, to be inserted through the opening 12 in the lower portion of the second plate 16. The second plate 16 is provided with a locking pawl pivot pin 22 which may be fixedly attached to the second plate 16 by suitable fastening means, such as welding, crimping or bolting the pin to the second plate 16. As the name implies, the locking pawl pivot pin 22 has pivotally attached thereto a locking pawl 24. The locking pawl pivot pin 22 pivot point is remote from the pivot point of the first and second plates 14 and 16. The locking pawl 24 has fixedly attached thereto a locking pawl control pin 26. The control pin 26 is fixedly attached to the locking pawl 24 by suitable fastening means. The longitudinal axis of the locking pawl control pin 26 is parallel to the longitudinal axis of the locking pawl pivot pin 22 and, similarly, to the longitudinal axis of the bushing 18.

The bushing 18 is provided with a cylindrical inner surface 28 which provides a bearing surface for a first rotary connecting shaft 30. The first rotary connecting shaft 30 is provided at one end thereof with an outer cylindrical surface 32 which is in bearing engagement with the bushing inner surface 28 and the end of the first rotary connecting shaft 30 has attached thereto a release handle 34. The release handle 34 may be so attached to the first rotary connecting shaft 30 by welding, bolting or other suitable means. The release handle 34 is provided with a small opening 36 into which the end of a helical spring 38 is inserted for attachment thereto. The other end of the helical spring 38 is attached to the second plate 16 by a suitable groove or opening. The helical spring 38 provides a biasing force on the release handle 34 to bias the handle toward the second plate 16 whose purpose is to be explained in further detail. The release handle is provided with an elongated opening or camming slot 40 and which operatively receives the locking pawl control pin 26. The locking pawl 24 is further provided with a series of teeth 42 complementary in form and in arch to the teeth 20 formed on the first plate 14 and also for selective intermeshing therewith in a manner to be further explained. The first plate 14 and the second plate 16 are pivotally biased toward each other on the cylindrical outer surface of the bushing 18 by the provision of a torsion bar or spring 44. The torsion spring 44 is fixedly attached generally at its ends to the first and second plates 14 and 16. More particularly, the torsion bar 44 is generally captured within an opening 46 in the first plate 14 and an opening 48 in a tab 50 formed on the second plate 16. The torsion spring 44 has a spring rate such that the spring forces that it applies to the first plate and second plate 14 and 16 increases as the plates are pivoted away one from the other.

The seat recliner mechanism 10 is further provided with a second unit from the one above described which is generally a mirror image thereof to be attached on the opposite side of the vehicle seat back and vehicle seat cushion to which the above portion of the mechanism is so attached. This second unit or portion of the seat recliner mechanism 10 is coupled to the first above described portion of the seat recliner mechanism 10 by means of a second rotary connecting shaft 52. The second rotary connecting shaft 52 is mechanically coupled to the first rotary connecting shaft 30 at the joint 54. The joint 54 comprises a square male end 56 formed on the first rotary connecting shaft 30 which is received by the female end 58 of the second rotary connecting shaft 52. The joints, i.e. the male joint 56 received within the female joint, are joined and assembled without interference fit.

The so called second portion or unit of the seat recliner mechanism 10 is provided with a third plate 60 which is substantially equivalent to the first plate 14. The third plate 60 is pivotally connected to a fourth plate 62 which is substantially equivalent to the second plate 16. As with the first and second plates 14 and 16, the third and fourth plates 60 and 62 are so formed and contoured to abut the seat back frame and the seat cushion frame, respectively, for attachment thereto. The third and fourth plates 60 and 62 are provided with suitable openings 64 for attaching these plates to the aforementioned seat back and cushion frames. The third plate 60 is pivotally connected to the fourth plate 62 at a bushing 66 which is substantially equivalent to the bushing 18. The third and fourth plates 60 and 62 pivot on the outer cylindrical surface of the bushing 66. The third plate 60 is provided with a series of teeth 68 which may be formed on the third plate 60. The teeth 68 are substantially equivalent to the teeth 20 provided on the first plate 14. The series of teeth 68 are formed in an arc whose radius is coincident with the radius of the bushing 66 and, therefore, the pivot point of the third and fourth plates 60 and 62. The fourth plate 62 is provided with a locking pawl pivot pin 70 which may be pivotally attached to the fourth plate 62 by suitable fastening means, such as welding, crimping or bolting the pin to the fourth plate 62. The locking pawl 70 is substantially equivalent to the locking pawl 22. The locking pawl pivot pin 70 has pivotally attached thereto a locking pawl 72. The locking pawl 72 being substantially equivalent to the locking pawl 24. The locking pawl 72 pivot point is remote from the pivot point of the third and fourth plates 60 and 62. The locking pawl 72 has fixedly attached thereto a locking pawl control pin 74. The control pin 74 is fixedly attached to the locking pawl 72 by suitable fastening means and is substantially equivalent to the control pin 26. The longitudinal axis of the locking pawl 74 is parallel to the longitudinal axis of the locking pawl pivot pin 70 and similar to the longitudinal axis of the bushing 66.

The bushing 66 is provided with a cylindrical inner surface 76 and, as before mentioned, provides a bearing surface for the second rotary connecting shaft 52. The second rotary connecting shaft 52 is provided at one end thereof with an outer cylindrical surface 78 for this purpose. At the end of the second rotary connecting shaft 52 there is attached a release lever 80. The release lever 80, as will be further discussed and described, is similar to the release handle 34. The release lever 80 is not independently actuated but is mechanically coupled to the release handle 34. The release lever 80 may be so attached to the second rotary connecting shaft as by welding, bolting or other suitable means. The release lever 80 is provided with a small opening 82 into which the end of a helical spring 84 is inserted for attachment thereto. The other end of the helical spring 84 is attached to the fourth plate 62 by a suitable groove or opening. The helical spring 84 provides a biasing force on the release lever 80 to bias the release lever toward the fourth plate 62 whose purpose will be further explained in detail. The helical spring 84 is substantially equivalent to the helical spring 38. The release lever 80 is further provided with an elongated opening or camming slot 86 which operatively receives the locking pawl control pin 74. The locking pawl 72 is further provided with a series of teeth 88 complementary in form and in arc to the teeth 68 formed on the third plate 60 for selective intermeshing therewith in a manner to be further explained. The third plate 60 and fourth plate 62 are pivotally biased toward each other on the cylindrical outer surface of the bushing 66 by the provision of a torsion bar or spring 90 which is substantially equivalent to the torsion bar or spring 44. The torsion spring 90 is fixedly attached generally at its ends to the third and fourth plates 60 and 62. The torsion bar or spring 90 is generally captured within an opening 92 in the third plate 60 and an opening 94 in a tab 96 formed on the fourth plate 62. The torsion springs or bars 44 and 90 are generally inwardly facing and substantially U-shaped. The U-shaped portions of each of the bars 44 and 90 travel a substantial inward distance somewhat short of the joint 54 which defines the mechanical connection between the first and second rotary connecting shafts 30 and 52. The first and second rotary connecting shafts 30 and 52 are each provided with stop collars 98 and 100 whose radial face are in bearing engagement with the radial face of a collar 102 and 104 formed on each of the bushings 18 and 66. The torsion spring 90 has a spring rate such that the spring force that it applies to the third and fourth plates 60 and 62 increases as the plates are pivoted away one from the other in a manner similar to the action of the torsion spring 44 acting upon the first and second plates 14 and 16.

It can be seen from the above description that the second portion of the seat recliner mechanism 10 coupled to the first above described portion of the seat recliner mechanism 10 is substantially a mirror image thereof; the major difference being in the release lever 80 in that it is mechanically coupled to and driven by the release handle 34. The seat recliner mechanism 10 is actuated by the movement of the release handle 34 against the biasing force of the helical spring 38. As the release handle 34 is moved upwardly away from the second plate 16 the locking pawl control pin 26 will ride in the elongated camming groove 40. The release lever 80 will act simultaneously and in the same fashion as the release handle in that it is coupled to the release handle through the first and second rotary connecting shafts 30 and 52. Consequently, as the release lever 80 moves simultaneously with the release handle 34 the pawl control pin 74 will move relative to the elongated camming slot 86 as each of the locking pawl control pins 26 and 74 move within their respective camming slots. As each of the pins 26 and 74 move within the slots 40 and 86 the locking pawls 24 and 72 to which they are attached will move away from the first and third plates 14 and 60 to disengage their respective teeth portions 42 and 88 thereby allowing the first plate 14 to move freely with respect to the second plate 16 and, similarly, the third plate 60 freely with respect to the fourth plate 62 both of which are acting against the torsion bars 44 and 90. In this position the back of the seat may be reclined to a position determined by the comfort of the passenger but generally within the range of 51 degrees total travel as determined by the arc and the number of teeth in the series of teeth 20 and 68. The travel may be divided into 6 degrees in a forward position from the vertical and 45 degrees rear travel with respect to the same vertical position. Obviously, the seat reclining position can be finally adjusted to any point intermediate the 51 degree total travel. Once the position of the seat back is selected, the release handle 34 is returned and, in a similar fashion, the release lever will return to their down position as biased by their respective helical springs 38 and 84. As the release handle 34 and its mechanically coupled release lever 80 return to the lower position, the locking pawl control pins 26 and 70 will again move relative to their respective elongated camming slots 40 and 86 to bring the locking pawls 24 and 72 into engagement with the teeth 20 and 68 at their respective teethed portions 42 and 88. Once these complementary teeth combinations are intermeshed, the first plate 14 is again locked with respect to the second plate 16 and similarly the third plate 60 is locked with respect to the fourth plate 62.

It will be seen, therefore, from the above description both of the structure and the operation of the present invention that there is provided a very simplistic but effective and unique seat recliner mechanism which is rugged and will withstand high G forces, i.e., will not tend to unlock under significant impact. This ruggedness and efficient operation is achieved without paying any significant penalty in terms of cost or weight. The materials for the various parts may be selected from a wide range of materials. For example, the release handle 34 and the second plate 16 may be manufactured from SA 1010 steel with suitable finishing. The locking pawls 24 and 72 may be manufactured from SAE 1035 steel while the locking pawl pivot pins 22 and 74 and bushings 18 and 66 may be manufactured from SAE 12 L 1A steel. The torsion bars or springs may be manufactured from ASTM 227 steel. The selection of materials of the various components as well as the finishing and hardening thereof will be all as determined by good engineering practices.

The drawings and the foregoing specification generally constitute a description of the improved seat recliner mechanism 10 in such a full, clear, concise and exact terms as enable any person skilled in the art to practice the invention. Obviously, the present invention is not to be limited to such above details but is capable of other modifications and changes without departing from the spirit and scope of the appended claims.

We claim:

1. A seat recliner mechanism comprising a first plate for attaching to one side of the back of said seat; a second plate pivotally connected to said first plate; said first plate being provided with a series of teeth formed in an arc whose radius is coincident with the pivot point of said first and second plates; said second plate to be attached to one side of the cushion of said seat; said second plate pivotally carrying a locking pawl having a pin attached thereto whose longitudinal axis is parallel to the longitudinal axis through said pivot point, said locking pawl being provided with a series of teeth complementary to said teeth provided on said first plate for selective intermeshing therewith; first spring means to pivotally bias said first plate toward said second plate; a release handle pivotally connected at at said pivot point to said first and second plates having a camming slot therein for receiving and camming said pin; second spring means biasing said release handle toward said second plate camming said pin and said pawl toward said second plate to mesh said series of teeth on said pawl with said teeth on said first plate to lock said first plate with respect to said second plate, said release handle when pivoted against said second spring means cams said pin and said pawl away from said second plate to unmesh said series of teeth on said pawl with said teeth on said first plate to unlock said first plate with respect to said second plate, said first and second plates pivot on an outer surface of a bushing, said release handle connected to a first rotary connecting shaft received within said bushing and in bearing engagement with the cylindrical inner surface thereof, said first rotary connecting shaft is coupled to a second rotary connecting shaft, the length of said first and second rotary connecting shafts generally spanning the width of said seat back and said seat cushion, the outboard end of said second rotary connecting shaft being drivingly connected to a release lever, wherein a third plate is attached to said back of said seat at the side opposite said first plate; a fourth plate pivotally connected to said third plate, said third plate being provided with a series of teeth formed in an arc whose radius is coincident with the pivot point of said third and fourth plates, said fourth plate to be attached to the cushion of said seat at the side opposite said second plate, said fourth plate pivotally carrying a locking pawl having a pin attached thereto whose longitudinal axis is parallel to the longitudinal axis through said pivot point, said locking pawl being provided with a series of teeth complementary to said teeth provided on said third plate for selective intermeshing therewith; third spring means to pivotally bias said third plate toward said fourth plate, said release lever acting in concert with said release handle through said first and second rotary connecting shafts, said release lever having a camming slot therein for receiving and camming said pin; fourth spring means biasing said release lever toward said fourth plate camming said pin and said pawl toward said fourth plate to mesh said series of teeth on said pawl with said teeth on said third plate to lock said third plate with respect to said fourth plate, said release lever when pivoted against said fourth spring means cams said pin and said pawl with said teeth on said third plate to unlock said third plate with respect to said fourth plate, wherein said third and fourth plates pivot on an outer surface of a bushing, said second rotary connecting shaft received within said bushing and in bearing engagement with the cylindrical inner surface thereof, wherein said second and fourth spring means are helically wound springs connected to the release handle and release lever respectively and to the second and fourth plates respectively, wherein said first and third spring means are inwardly facing substantially U-shaped torsion bars connected to the first and second plates and third and fourth plates respectively, wherein said first and second rotary connecting shafts are mechanically coupled to each other in a non-interference fit at substantially the mid point of said cushion and back of said seat.

2. The seat recliner mechanism as set forth in claim 1, wherein said bushings which pivotally connect said first and second and said third and fourth plates are each provided with an annular collar the radial face of which are in bearing engagement with the radial face of a collar formed on each of said first and second rotary connecting shafts.

3. The seat recliner mechanism as set forth in claim 2, wherein there are stop means provided on said first and second and said third and fourth plates to limit the travel of said first and second plates and said third and fourth plates with respect to each other to approximately a 51 degree arc.

* * * * *